United States Patent Office 3,437,662
Patented Apr. 8, 1969

3,437,662
POLYHYDROISOQUINOLINE
ANTIVIRAL AGENTS
David R. Gildersleve, Minster, near Ramsgate, and
Michael S. Tute, Canterbury, England, assignors
to Chas. Pfizer & Co., Inc., New York, N.Y., a
corporation of Delaware
No Drawing. Continuation-in-part of application Ser. No.
513,600, Dec. 13, 1965. This application Mar. 31, 1967,
Ser. No. 627,293
Claims priority, application Great Britain, Apr. 1, 1966,
14,429/66
Int. Cl. C07d 35/28, 35/14, 35/10
U.S. Cl. 260—286                    10 Claims

ABSTRACT OF THE DISCLOSURE

A series of 1-phenoxyalkyl-3,4-dihydroisoquinolines and 1-phenoxyalkyl-1,2,3,4-tetrahydroisoquinolines, including their pharmaceutically acceptable acid addition salts, have been found to possess valuable antiviral properties.

1-(4-chlorophenoxymethyl)-3,4-dihydroisoquinoline hydrochloride,
1-(4-hydroxyphenoxymethyl)-3,4-dihydroisoquinoline hydrochloride,
1-(4-hydroxyphenoxymethyl)-7-methyl-3,4-dihydroisoquinoline hydrobromide,
1-(2,6-dimethyl-4-chlorophenoxymethyl)-3,4-dihydroisoquinoline hydrochloride,
1-(4-chlorophenoxymethyl)-3,3-dimethyl-3,4-dihydroisoquinoline and
1-(4-chlorophenoxymethyl)-1,2,3,4-tetrahydroisoquinoline hydrochloride are particularly effective against viruses of the influenza group, while 1-(4-nitrophenoxymethyl)-3,4 - dihydroisoquinoline hydrochloride as well as 1-(4-chlorophenoxymethyl) - 1,2,3,4 - tetrahydroisoquinoline hydrochloride strongly inhibit the clinically important viruses of the Echo and Coxsackie groups, based on in vitro testing.

This application is a continuation-in-part of previously copending patent application Ser. No. 513,600, filed Dec. 13, 1965, and now abandoned.

This invention relates to new and useful polyhydroisoquinoline compounds. More particularly, it is concerned with a novel class of 1-phenoxymethyl-3,4-dihydroisoquinolines and 1-phenoxymethyl-1,2,3,4 - tetrahydroisoquinolines and their acid addition salts, which have been found to possess valuable antiviral properties.

The novel compounds which are included within the purview of the present invention are selected from the group consisting of compounds of the formulae:

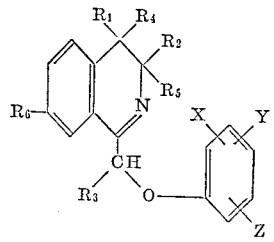

and

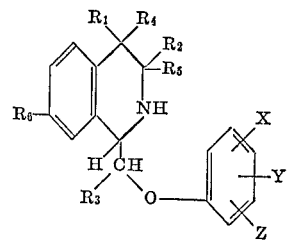

and the pharmaceutically acceptable salts thereof, wherein $R_1$, $R_2$, $R_3$, $R_4$, $R_5$ and $R_6$ are each selected from the group consisting of hydrogen and alkyl containing up to four carbon atoms, and X, Y and Z each represent members selected from the group consisting of hydrogen, alkyl having up to five carbon atoms, alkoxy having up to five carbon atoms, hydroxy, carboxy, carbalkoxy containing up to five carbon atoms in the alkoxy moiety, cyano, nitro, fluorine, chlorine and bromine. These compounds are all of value in the field of chemotherapy since they are highly effective antiviral agents, and are particularly useful against the influenza virus.

Typical member compounds of this invention include 1-(4-chlorophenoxymethyl)-3,4-dihydroisoquinoline,
1-(4-fluorophenxoymethyl)-3,4-dihydroisoquinoline,
1-(4-methoxyphenoxymethyl)-3,4-dihydroisoquinoline,
1-(4-hydroxyphenoxymethyl)-3,4-dihydroisoquinoline,
1-(2,6-dimethyl-4-chlorophenoxymethyl)-3,4-dihyroisoquinoline,
1-[α-(4-chloro-2-methylphenoxy)ethyl]-3,4-dihydroisoquinoline,
1-(4-chlorophenoxymethyl)-1,2,3,4-tetrahydroisoquinoline,
1-phenoxymethyl-1,2,3,4-tetrahydroisoquinoline,
1-(4-chlorophenoxymethyl)-3,3-dimethyl-3,4-dihydroisoquinoline,
1-(4-nitrophenoxymethyl)-3,4-dihydroisoquinoline,
1-(4-cyanophenoxymethyl)-3,4-dihydroisoquinoline,
1-(4-carboxyphenoxymethyl)-3,4-dihydroisoquinoline,
1-(4-methoxycarbonylphenoxymethyl)-3,4-dihydroisoquinoline and
1-(2,6-dichlorophenoxymethyl)-3,4-dihydroisoquinoline, as well as their nontoxic pharmaceutically acceptable acid addition salts, such as the hydrohalides, and the nontoxic base salts which the acidic compounds will form with bases containing pharmacologically acceptable cations.

The process employed for preparing the novel compounds of this invention involves contacting an appropriate substituted N-phenoxyacetyl-β-phenylethylamine in a reaction-inert organic solvent medium with a strongly acidic dehydrating agent of the type employed in the Bischler-Napieralksi reaction, whereby cyclization of said amide is effected according to the following reaction scheme:

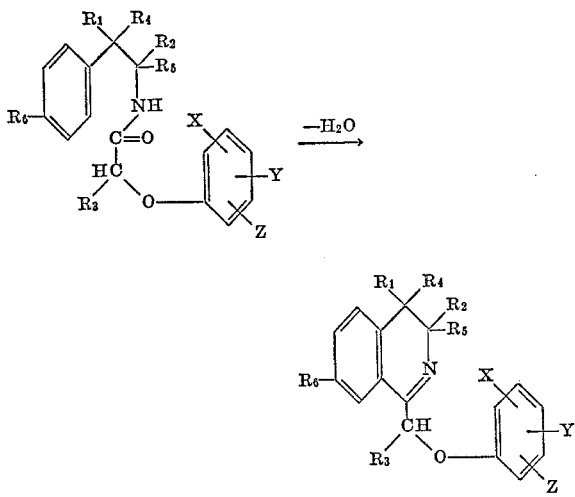

wherein $R_1$, $R_2$, $R_3$, $R_4$, $R_5$ and $R_6$ as well as X, Y and Z are all as previously defined. Peferred acidic cyclizing-dehydrating agents for use in this connection include such reagents as phosphorus pentoxide, 85% polyphosphoric acid, polyphosphoric ester, phosphorus pentachloride, aluminum chloride, zinc chloride, phosphorus oxychloride, phosphorus oxybromide, thionyl chloride, etc. In general, the reaction is normally carried out in the aforementioned solvent medium at temperatures ranging from between about 15° C. up to about 130° C. for a period of about one to twelve hours. Aromatic hydrocarbon solvents like benzene, toluene, xylene and nitrobenzene are preferable, but halogenated hydrocarbon solvents, such as methylene chloride, ethylene dichloride, chloroform, carbon tetrachloride and s-tetrachlorethane may also be used. In accordance with a further modification of this process, it is possible to use excess dehydrating agent, e.g., 85% polyphosphoric acid, as the reaction medium instead and eliminate the use of the organic solvent medium. In either case, upon completion of the reaction, the desired dihydroisoquinoline base is either isolated from the reaction mixture as such or first converted to an acid addition salt thereof, which is then subsequently recovered from the mixture by conventional means. This acid addition salt may then be purified and used as such, if pharmaceutically-acceptable, or it may be converted back to the free base or to a pharmaceutically acceptable acid addition salt itself, if so desired.

The N-phenoxyacetyl-β-phenylethylamine starting materials are easily prepared by conventional methods, starting from either the appropriate β-phenylethylamine base and an appropriate phenoxyacetyl halide or an appropriate phenoxyacetic acid ester. Of the two routes, the one using the phenoxyacetyl halide (e.g., 4-chlorophenoxyacetyl chloride) is preferred, since this usually only involves refluxing the two reactants together in an aromatic hydrocarbon solvent such as benzene, with an excess of β-phenylethylamine reagent being used to remove hydrogen halide by-product. On the other hand, to prepare the amides (i.e., the N-phenoxyacetyl-β-phenylethylamines) in which both $R_2$ and $R_5$ are alkyl groups containing up to four carbon atoms, a tertiary alcohol of the general formula $\varphi$-C($R_1$)($R_4$)C($R_2$)($R_5$)OH is reacted with the appropriate phenoxyacetonitrile compound in the presence of a concentrated sulfuric-acetic acid medium.

An alternative process for the preparation of the compounds of this invention entails reacting an appropriate phenoxyacetonitrile compound with an appropriately substituted β-phenylethyl halide in the presence of stannic chloride (a so-called one-step stannic chloride condensation reaction). In general, the reaction may be carried out without solvent, but usually a reaction-inert aromatic hydrocarbon solvent like benzene, toluene, or xylene is employed or even an excess of the β-phenylethyl halide reagent may be added as diluent instead. In either case, the desired dihydroisoquinoline base compound is easily isolated from the reaction mixture after first heating same at a temperature of from 80–150° C. for 1–6 hours, cooling and then pouring slowly into ice-water. The free base compound may then be simply converted to a pharmaceutically acceptable acid addition salt as previously discussed. Needless to say, the appropriate phenoxyacetonitrile required as starting material for the reaction is easily prepared by conventional means, e.g., by using a Williamson-type synthesis involving reaction between the corresponding chloroacetonitrile and the appropriate phenol.

Needless to say, dihydroisoquinolines of this invention which contain a reactive hydrogen atom in the X, Y or Z substituent groups are prepared from the certain of the corresponding dihydroisoquinolines in which X, Y or Z contain no such reactive atoms. For instance, dihydroisoquinolines where the X, Y or Z substituent is a hydroxyl group can be obtained from the corresponding compound in which X, Y or Z is alkoxyl by means of cleavage of the oxygen-carbon (alkyl) bond, using concentrated hydriodic or hydrobromic acid. On the other hand, those dihydroisoquinolines in which X, Y or Z is a carboxyl group can be prepared from the corresponding compound where the aforementioned substituent group is cyano by simply using hydrolytic means for the conversion. These latter carboxylic acid compounds, in turn, lead directly to the corresponding esters by means of standard organic procedures well-known to those skilled in the art.

As regards the compounds of this invention which are 1,2,3,4-tetrahydroisoquinolines, i.e., dihydro derivatives of the aforementioned dihydroisoquinolines, having the formula:

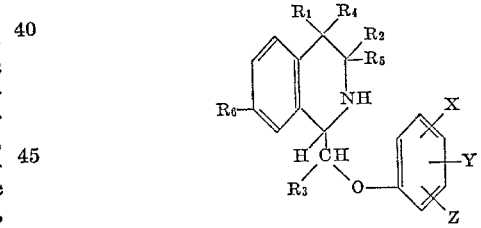

these can be prepared by the reduction of the corresponding 3,4-dihydroisoquinolines, preferably by means of alkali metal borohydrides, such as sodium, potassium or lithium borohydride, in accordance with the conventional methods of organic chemistry.

The acids which are used to prepare the pharmaceutically acceptable acid addition salts of this invention are those which form nontoxic acid addition salts, i.e., those containing pharmacologically acceptable anions, with the previously discussed polyhydroisoquinoline bases. Preferred acids include phosphoric acid, acetic acid, lactic acid, citric acid, tartaric acid, oxalic acid, gluconic acid, saccharic acid, benzoic acid, succinic acid, maleic acid, methanesulfonic acid, ethanesulfonic acid, benzenesulfonic acid, p-toluenesulfonic acid, amsonic acid (4,4'-diaminostilbene-2,2'-disulfonic acid) and pamoic acid (1,1'-methylene-bis-2-hydroxy-3-naphthoic acid).

The bases which are used to prepare the pharmaceutically acceptable base salts of this invention are those which form nontoxic base salts, i.e., those having pharmacologically acceptable cations, with the previously discussed polyhydroisoquinolines possessing an acidic grouping, such as the carboxyl group, etc. Preferred bases for use in this connection include those which form non-toxic salts, such as the alkali metal and alkaline-earth metal salts (e.g., sodium, potassium and calcium salts) and the ammonium and/or water-soluble amine addition salts like the lower alkanolammonium salts (e.g., triethanolammonium salts) and other organic amine salts which are compatible with human system.

As previously indicated, the polyhydroisoquinoline compounds of this invention are therapeutically useful as antiviral agents, and particularly against viruses of the influenza group and against clinically important viruses of the Echo and Coxsackie groups. For instance, 1-(4-chlorophenoxymethyl) - 3,4 - dihydroisoquinoline hydrochloride, a typical and preferred agent of the present invention, has been found to produce a significant increase in mean survival time in influenza-infected mice (infected with influenza PR8 virus) without causing any untoward side effects. In addition, the incubation of influenza A2 virus at 37° C. in the presence of small amounts (e.g., a concentration of 25 $\gamma$/ml. in chorioallantoic fluid) of 1-(4-hydroxyphenoxymethyl) - 3,4 - dihydroisoquinoline hydrochloride, 1-(-hydroxyphenoxymethyl)-7-methyl-3,4-dihydroisoquinoline hydrobromide, 1 - (2,6-dimethyl-4-chlorophenoxymethyl) - 3,4 - dihydroisoquinoline hydrochloride, 1-(4-chlorophenoxymethyl) - 3,3 - dimethyl-3,4-dihydroisoquinoline or 1-(4-chlorophenoxymethyl)-1,2,3,4-tetrahydroisoquinoline hydrochloride has been found to result in the inactivation of from $10^1$ to $10^6$ $EID_{50}$'s of the influenza virus in each instance (where $EID_{50}$ represents the minimum amount of compound necessary to infect 50% of the eggs).

In like manner, the addition of 1-(4-nitrophenoxymethyl)-3,4-dihydroisoquinoline hydrochloride to tissue culture systems infected with the viruses Echo 6, Echo 7, Echo 8, Echo 9, Echo 11, Coxsackie B3, Coxsackie B5 or Coxsackie B6 resulted in a greater than ten-fold reduction in virus yield. In the same tissue culture systems, 1-(4-chlorophenoxymethyl)-1,2,3,4 - tetrahydroisoquinoline hydrochloride also inhibited Echo 7, Echo 11 and Coxsackie A9 viruses. Further, all the herein described compounds of this invention can be administered to an infected subject as antiviral agents by either the oral or parenteral routes of administration. In general, these compounds are ordinarily administered in dosages ranging from about 1 mg. to about 25 mg. per kg. of body weight per day, although variations will necessarily occur depending upon the weight of the subject being treated and the particular route of administration chosen.

In connection with the use of the polyhydroisoquinoline compounds of this invention for the treatment of infected subjects, it is to be noted that they may be administered either alone or in combination with pharmaceutically acceptable carriers by either of the routes previously indicated, and that such administration can be carried out in both single and multiple dosages. More particularly, the novel compounds of this invention can be administered in a wide variety of different dosage forms, i.e., they may be combined with various pharmaceutically acceptable inert carriers in the form of tablets, capsules, lozenges, troches, hard candies, powders, sprays (directed to the upper respiratory tract), aqueous suspensions, injectable solutions, elixirs, syrups, and the like. Such carriers include solid diluents or fillers, sterile aqueous media and various nontoxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelating capsules; preferred materials in this connection would also include lactose or milk sugar as well as high molecular weight polyethylene glycols. When aqueous suspensions and/or elixirs are desired for oral administration, the essential active ingredient therein may be combined with various sweetening or flavoring agents, coloring matter or dyes and, if so desired, emulsifying and/or suspending agents, together with such diluents as water, ethanol, propylene glycol, glycerin and various like combinations thereof.

For purposes of parenteral administration, solutions of these particular polyhydroisoquinoline bases in sesame or peanut oil or in aqueous-propylene glycol or in N,N-dimethylformamide may be employed, as well as sterile aqueous solutions of the corresponding water-soluble, non-toxic salts previously enumerated. Such aqueous solutions should be suitably buffered if necessary and the liquid diluent first rendered isotonic with sufficient saline or glucose. These particular aqueous solutions are especially suitable for intravenous, intramuscular and intraperitoneal injection purposes. Needless to say, the necessary steps should be taken throughout the preparation of these injectable solutions to ensure that the final products are obtained in a sterile condition.

This invention is still further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

EXAMPLE I

To a warm solution (at 80° C.) consisting of 56 g. (0.193 mole) of N - (4-chlorophenoxyacetyl)-$\beta$-phenylethylamine in 600 ml. of dry toluene, there were added 165 g. (1.162 moles) of phosphorus pentoxide in divided portions over a period of thirty minutes with vigorous constant stirring being maintained throughout the course of the addition. Upon completion of the addition, the reaction mixture was refluxed with continued agitation for three hours and then cooled to room temperature. At this point, excess toluene was removed by decantation from the solid material present and the latter was then added to one liter of ice-water with stirring. The resulting aqueous solution containing crude 1-(4-chlorophenoxymethyl)-3,4-dihydroisoquinoline was then extracted with 200 ml. of diethyl ether to remove residual toluene and subsequently treated with 500 ml. of concentrated hydrochloric acid to form the corresponding hydrochloride salt of the dihydroisoquinoline compound so produced. The desired product commenced separating from the mixture almost immediately and after standing for two hours, it was removed and collected by means of suction filtration and subsequently recrystallized from methanol-hydrochloric acid (1:4 by volume) to give a 37 g. (62%) yield of 1-(4-chlorophenoxymethyl) - 3,4 - dihydroisoquinoline hydrochloride in the form of colorless needles melting at 205–207° C.

*Analysis.*—Calcd. for $C_{16}H_{15}Cl_2NO$: C, 62.33; H, 4.91; N, 4.54. Found: C, 62.60; H, 5.00; N, 4.47.

Subsequent conversion of the above hydrochloride to the free base via treatment with 5 N NaOH then affords the pure 1-(4-chlorophenoxymethyl)-3,4-dihydroisoquinoline.

EXAMPLE II

The procedure of Example I was repeated, while substituting N - (4-fluorophenoxyacetyl)-β-phenylethylamine as starting material to afford 1-(4-fluorophenoxymethyl)-3,4-dihydroisoquinoline as final product. The latter compound was subsequently isolated as the hydrochloride, M.P. 201–203° C.

*Analysis.*—Calcd. for $C_{16}H_{15}ClFNO$: F, 6.51. Found: F, 6.53.

Subsequent conversion of the above salt to the free base as in Example I then affords pure 1-(4-fluorophenoxymethyl)-3,4-dihydroisoquinoline.

EXAMPLE III

The following products lisited below, together with their melting points, were prepared from the appropriate N-phenoxyacetyl-β-phenylethylamine base compound and phosphorus pentoxide in accordance with the procedure of Example I In those cases where the hydrochloride was too soluble to precipitate from solution [as was the case with the hydrochloride salt of 1(4-methoxyphenoxymethyl)-3,4-dihydroisoquinoline], basification of said solution was accomplished with 50% aqueous sodium hydroxide followed by extraction with diethyl ether to isolate the base. Upon the addition of ethereal HCl to the latter extract, the desired hydrochloride was achieved as a crystalline precipitate.

1-phenoxymethyl-3,4-dihydroisoquinoline hydrochloride, M.P. 210–212° C.
1-(4-methylphenoxymethyl)-3,4-dihydroisoquinoline hydrochloride, M.P. 188–189° C.
1-(1-phenoxyethyl)-3,4-dihydroisoquinoline hydrochloride, M.P. 160–162° C.
1-phenoxymethyl-3-methyl-3,4-dihydroisoquinoline hydrochloride, M.P. 159–161° C.
1-phenoxymethyl-4-methyl-3,4-dihydroisoquinoline hydrochloride, M.P. 207–208° C.
1-(3-methylphenoxymethyl)-3,4-dihydroisoquinoline hydrochloride, M.P. 186–188° C.
1-(3-chlorophenoxymethyl)-3,4-dihydroisoquinoline hydrochloride, M.P. 192–193° C.
1-(2-fluorophenoxymethyl)-3,4-dihydroisoquinoline hydrochloride (monohydrate), M.P. 147–149° C.
1-(3-fluorophenoxymethyl)-3,4-dihydroisoquinoline hydrochloride (monohydrate), M.P. 190–195° C.
1-[4-(n-butoxy)phenoxymethyl]-3,4-dihydroisoquinoline hydrochloride, M.P. 172–173° C.
1-(4-tert-butylphenoxymethyl)-3,4-dihydroisoquinoline hydrochloride, M.P. 213–215° C.
1-(4-bromophenoxymethyl)-3,4-dihydroisoquinoline hydrochloride, M.P. 207° C.
1-[1-(4-chlorophenoxy)ethyl]-3,4-dihydroisoquinoline hydrochloride (monohydrate), M.P. 85° C.
1-(4-methoxyphenoxymethyl)-3,4-dihydroisoquinoline hydrochloride, M.P. 187° C.

Subsequent conversion of each of the above hydrochlorides to the free base compound in each case via 5 N NaOH then affords the corresponding 1-phenoxymethyl-3,4-dihydroisoquinoline in pure form as such.

EXAMPLE IV

The products listed in the table below are prepared from the appropriate N-phenoxyacetyl-β-phenylethyl amine base compound and phosphorous pentoxide in accordance with the procedure described in Example I:

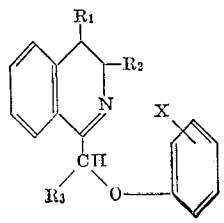

| $R_1$ | $R_2$ | $R_3$ | X |
|---|---|---|---|
| H | H | H | 3-Br |
| H | H | H | 2-OCH$_3$ |
| CH$_3$ | H | H | 2-Cl |
| H | C$_2$H$_5$ | H | 2-F |
| H | H | C$_2$H$_5$ | H |
| CH$_3$ | CH$_3$ | CH$_3$ | 2-CH$_3$ |
| C$_2$H$_5$ | H | H | H |
| H | H | H | 3-C$_2$H$_5$ |
| H | H | C$_2$H$_5$ | 4-Br |
| H | H | H | 4-(n-C$_5$H$_{11}$) |
| H | n-C$_3$H$_7$ | H | H |
| n-C$_4$H$_9$ | H | H | 3-Cl |
| H | H | n-C$_4$H$_9$ | 3-OC$_3$H$_7$(i) |
| Iso-C$_3$H$_9$ | H | H | 2-Br |
| H | Iso-C$_4$H$_9$ | CH$_3$ | 4-OCH$_3$ |
| CH$_3$ | H | H | 4-OC$_2$H$_5$ |
| H | H | CH$_3$ | H-OCH$_3$ |
| H | CH$_3$ | H | H |
| H | H | Iso-C$_3$H$_7$ | 3-C$_2$H$_5$ |
| H | H | H | 3-F |
| CH$_3$ | CH$_3$ | C$_2$H$_5$ | 4-Cl |
| H | C$_2$H$_5$ | CH$_3$ | 2-OC$_4$H$_9$ |
| H | H | CH$_3$ | 3-Br |
| CH$_3$ | H | H | H |
| n-C$_4$H$_9$ | H | H | 3-(iso-C$_4$H$_9$) |
| H | CH$_3$ | H | 4-OC$_5$H$_{11}$ |
| H | H | H | |

EXAMPLE V

The hydrobromide salt of 1-(4-chlorophenoxymethyl)-3,4-dihydroisoquinoline is prepared by dissolving the free base compound in an aqueous solution containing an equivalent amount in moles of 1 N hydrobromic acid. Upon completion of this step, the resultant solution is evaporated to dryness, under reduced pressure, to afford pure crystalline 1-(4-chlorophenoxymethyl)-3,4-dihydroisoquinoline hydrobromide.

EXAMPLE VI

Other acid addition salts of the novel 1-phenoxymethyl-3,4-dihydroisoquinolines of this invention are prepared by the same general procedure described in Example V using the appropriate free organic base compounds of Examples I–IV as starting materials and hydrochloric, hydrobromic, hydriodic, nitric, sulfuric, phosphoric, methanesulfonic, ethanesulfonic, benzenesulfonic, p-toluenesulfonic, acetic, lactic, citric, tartaric, oxalic, benzoic, succinic and maleic acids as reagents.

EXAMPLE VII

To a solution of 10 g. (0.06 mole) of 4-chlorophenoxyacetonitrile in 10 ml. of dry xylene, there were added, with cooling, 15.5 g. of stannic chloride, followed by 8.4 g. (0.06 mole) of β-phenylethyl chloride. The resulting mixture was then stirred and heated to reflux for three hours, after which time it was allowed to cool and then poured slowly into 100 ml. of icecold water. The aqueous mixture was then basified with excess 50% aqueous sodium hydroxide, and the product extracted therefrom by means of three-successive 200 ml. portions of diethyl ether. After drying the combined ether extracts over anhydrous magnesium sulfate and filtering, dry ethereal hydrogen chloride was passed into the resulting solution in a dropwise manner until precipitation of the crude hydrochloride salt was complete. The ethereal suspension was then stirred for one-half hour at 0° C. before filtering.

The crude material so obtained in this manner was then dissolved in 50 ml. of methanol and treated with activated charcoal. This solution was then filtered and concentrated in vacuo to a volume of 20 ml. Upon the addition of an equal volume (20 ml.) of diethyl ether to the methanolic concentrate, there was obtained on standing pure crystalline precipitate. This material, after two recrystallizations from 5 N hydrochloric acid, gave 2.4 g. (13%) of pure 1-(4-chlorophenoxymethyl)-3,4-dihydroisoquinoline hydrochloride in the form of colorless needles melting at 205–207° C. This product was identical in every respect with that of Example I as attested to by a comparison of their infra-red analytical spectra.

EXAMPLE VIII

The procedure described in Example VII is repeated to prepare the other 1-phenoxymethyl-3,4-dihydroisoquinolines reported previously by merely substituting the appropriate phenoxyacetonitrile compound and the appropriately substituted β-phenylethyl chloride in place of the reactants used above.

EXAMPLE IX

A mixture of 50 g. of 1-(4-methoxyphenoxymethyl)-3,4-dihydroisoquinoline hydrochloride (prepared as in Example III) in 150 ml. of 60% hydrobromic acid was heated on a steam bath, with occasional stirring, for two hours. On the addition of 100 g. of chipped ice to the cooled reaction mixture, a yellow precipitate soon formed and this was subsequently separated by means of filtration, washed with a little ice-water and then added to one-liter of a saturated sodium bicarbonate solution with rapid stirring. The resulting suspension of free hydroxy base compound was then further stirred for one-half hour, filtered, washed with water and subsequently air-dried to give the desired 1-(4-hydroxyphenoxymethyl)-3,4-dihydroisoquinoline, M.P. 192–193° C. after recrystallization from ethanol.

*Analysis.*—Calcd. for $C_{16}H_{15}NO_2$: C, 76.00; H, 5.92. Found: C, 75.89; H, 5.82.

A solution of 1-(4-hydroxyphenoxymethyl) - 3,4 - dihydroisoquinoline in ethanol was prepared by dissolving said base compound in a minimum amount of solvent necessary to effect said solution. The latter was then cooled to 5° C. and treated with a saturated solution of hydrogen chloride dissolved in diethyl ether. The resulting hydrochloride salt, which precipitated almost immediately, was recrystallized from ethanol-diethyl ether to afford 25 g. of pure 1-(4-hydroxyphenoxymethyl)-3,4-dihydroisoquinoline hydrochloride as a white micro-crystalline solid, M.P. 226–228° C. (decomp.).

EXAMPLE X

The procedure of the previous example was employed to prepare the 7-methyl derivative of the product of Example IX by using 4-methoxyphenoxyacetyl-β-(p-tolyl)ethylamine as the starting material, and then demethylating the resulting cyclized intermediate to form the desired compound. In this manner, there was obtained 1-(4-hydroxyphenoxymethyl)-7-methyl - 3,4 - dihydroisoquinoline hydrobromide, M.P. 215–220° C. (decomp.).

*Analysis.*—Calcd. for $C_{17}H_{18}BrNO_2$: C, 58.60; H, 5.21; N, 4.02. Found: C, 58.33; H, 5.29; N, 3.84.

EXAMPLE XI

The following 1-(hydroxyphenoxyalkyl)-3,4-dihydroisoquinoline final products are prepared by the procedure of Example IX starting from the appropriate alkoxyphenoxyalkyl-3,4-dihydroisoquinoline compound of Examples III–IV in each and every case:

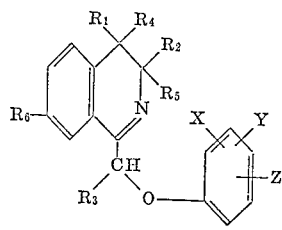

| $R_1$ | $R_4$ | $R_2$ | $R_5$ | $R_3$ | $R_6$ | X | Y | Z |
|---|---|---|---|---|---|---|---|---|
| $CH_3$ | H | H | H | H | H | 4-OH | H | H |
| H | H | $CH_3$ | H | H | H | 4-OH | H | H |
| H | H | H | H | $CH_3$ | H | 4-OH | H | H |
| H | H | H | H | $CH_3$ | H | 4-OH | 2-$CH_3$ | H |
| H | H | H | H | H | H | 2-OH | H | H |
| H | H | H | H | H | H | 3-OH | H | H |
| H | H | n-$C_4H_9$ | H | H | H | 3-OH | H | H |
| H | H | $CH_3$ | H | H | H | 2-OH | H | H |

EXAMPLE XII

The procedure of Example I was repeated to prepare 1-(2,6-dimethyl - 4 - chlorophenoxymethyl)-3,4-dihydroisoquinoline hydrochloride, starting from N-(2,6-dimethyl-4 - chlorophenoxyacetyl) - β - phenylethylamine and phosphorus pentoxide. In this particular case, the final product obtained melted at 202–204° C.

*Analysis.*—Calcd. for $C_{18}H_{19}Cl_2NO$: C, 64.30; H, 5.70; N, 4.17. Found: C, 64.48; H, 5.51; N, 4.21.

Subsequent conversion of the above hydrochloride salt to the corresponding free base compound, via 5 N NaOH as in Example I, then affords pure 1-(2,6-dimethyl-4-chlorophenoxymethyl-3,4-dihydroisoquinoline.

EXAMPLE XIII

The procedure of Example I was repeated again to prepare the following 1-phenoxymethyl-3,4-dihydroisoquinolines, starting from the appropriate N-phenoxyacetyl-phenylethylamine in each case:

1-(4-chloro - 2 - methylphenoxymethyl) - 3,4 - dihydroisoquinoline hydrochloride, M.P. 208–209° C.

1-[α-(4-chloro - 2 - methylphenoxy)ethyl]-3,4-dihydroisoquioline hydrochloride, M.P. 164–167° C.

1-(2,4 - dimethylphenoxymethyl) - 3,4 - dihydroisoquinoline hydrochloride, M.P. 179–182° C.

1-(3,4 - dimethylphenoxymethyl) - 3,4 - dihydroisoquinoline hydrochloride, M.P. 211–213° C.

1-(4 - chlorophenoxymethyl) - 7 - methyl - 3,4-dihydroisoquinoline hydrochloride, M. P. 205° C. (decomp.)

1-(4-methoxyphenoxymethyl) - 7 - methyl - 3,4 - dihydroisoquinoline hydrochloride, M.P. 191° C.

EXAMPLE XIV

The following 1-(phenoxymethyl) - 3,4 - dihydroisoquinolines, having at least one substituent group in the aromatic phenyl ring, are prepared by the procedure of Example I starting from the appropriate N-phenoxyacetyl-β-phenylethylamine in each case:

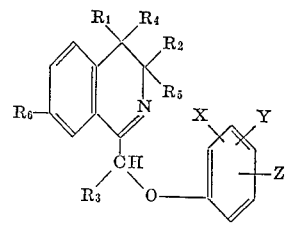

| $R_1$ | $R_4$ | $R_2$ | $R_5$ | $R_3$ | $R_6$ | X | Y | Z |
|---|---|---|---|---|---|---|---|---|
| $CH_3$ | $CH_3$ | H | H | H | H | 4-Cl | H | H |
| H | H | H | H | $CH_3$ | H | 2-Cl | 4-Cl | H |
| H | H | H | H | H | H | 2-Br | 4-Br | H |
| H | H | H | H | H | H | 2-$CH_3$ | 6-$CH_3$ | H |
| H | H | H | H | $CH_3$ | H | 2-$OCH_3$ | 4-$OCH_3$ | H |
| H | H | H | H | H | H | 2-Cl | 4-$CH_3$ | H |

EXAMPLE XV

To a solution of 67 g. of 4-chlorophenoxyacetonitrile in 150 ml. of glacial acetic acid, there was added a mixture consisting of 50 ml. of glacial acetic and 100 ml. of concentrated sulfuric acid, with stirring, during the course of a five-minute period. Sixty grams of phenyl tert.-butanol were then added to the resulting mixture over a one-minute period with stirring, during which time the temperature of the reaction mixture rose to 60° C. The resulting reaction mixture was then heated to 70° C., with continued stirring, for one-half hour, and cooled and allowed to remain at room temperature for a further two hours. Upon pouring the spent mixture into 500 ml. of cold water and rendering the resulting aqueous system alkaline by adding sufficient bulk portions of solid sodium bicarbonate, there was obtained a basic aqueous solution that was subsequently extracted with diethyl ether. The combined ethereal extracts were then dried over anhydrous sodium sulfate, filtered and the ethereal solvent removed from the filtrate by means of evaporation under reduced pressure. Recrystallization of the resulting residual material from light petroleum ether (B.P. 80–100° C.) then afforded a 112 g. (88%) yield of N-(4 - chlorophenoxyacetyl) - α,α - dimethyl-β-phenylethylamine in the form of a crystalline product, M.P. 68–69° C.

When this particular compound was subjected to the procedure of Example I, there was obtained 1-(4-chlorophenoxymethyl)-3,3-dimethyl-3,4-dihydroisoquinoline hydrochloride as the final product, M.P. 142–143° C.

*Analysis.*—Calcd. for $C_{18}H_{19}Cl_2NO$: C, 64.30; H, 5.70; Cl, 21.36. Found: C, 64.60; H, 5.81; Cl, 21.09.

Subsequent conversion of the above salt to the free base compound as in Example I, then affords pure 1-(4-chlorophonoxymehyl)-3,3-dimethyl-3,4-dihydroisoquinoline.

EXAMPLE XVI

The procedure described in the previous example is repeated starting with 4-methoxyphenylacetonitrile in place of the corresponding 4-chloro compound used above. In this particular case, N-(p-methoxyphenoxyacetyl)-α,α-dimethyl-β-phenylethylamine is the amide intermediate obtained, while 1-(p-methoxyphenoxymethyl)-3,3-dimethyl-3,4-dihydroisoquinoline and its hydrochloride salt are the final products respectively obtained.

EXAMPLE XVII

When 1-(4-methoxyphenoxymethyl)-3,3-dimethyl-3,4-dihydroisoquinoline hydrochloride, prepared as described above, is subjected to the procedure of Example IX, the corresponding product obtained is 1-(4-hydroxyphenoxymethyl)-3,3-dimethyl-3,4-dihydroisoquinoline, i.e., a compound of the general formula set forth in Example XI where $R_1$, $R_4$ and $R_6$ are hydrogen, $R_2$ and $R_5$ are methyl, $R_3$ is hydrogen, X is 4—OH, and Y and Z are both hydrogen.

EXAMPLE XVIII

The procedure described in Example I was repeated using N-(4-nitrophenoxyacetyl)-β-phenylethylamine as starting material to afford 1-(4-nitrophenoxymethyl)-3,4-dihydroisoquinoline hydrochloride as the final product, M.P. 216° C.

*Analysis.*—Calcd. for $C_{16}H_{15}ClN_2O_3$: C, 60.25; H, 4.70; N, 8.78. Found: C, 59.82; H, 4.72; N, 8.92.

Subsequent conversion of the above salt to the free base compound as in Example I, then affords pure 1-(4-nitrophenoxymethyl)-3,4-dihydroisoquinoline.

EXAMPLE XIX

The procedure described in Example I was repeated using N-(4-cyanophenoxyacetyl) - β - phenylethylamine as starting material to afford 1-(4-cyanophenoxymethyl)-3,4-dihydroisoquinoline hydrochloride as the final product, M.P. 208° C.

*Analysis.*—Calcd. for $C_{17}H_{15}ClN_2O$: C, 68.30; H, 5.06; Cl, 11.87. Found: C, 68.00; H, 5.06; Cl, 11.85.

Subsequent conversion of the above salt to the corresponding free base as in Example I, then affords pure 1-(4-cyanophenoxymethyl)-3,4-dihydroisoquinoline.

EXAMPLE XX

One gram of 1-(4-cyanophenoxymethyl)-3,4-dihydroisoquinoline hydrochloride, prepared as described in the preceding example, was heated under reflux in 20 ml. of concentrated hydrochloric acid for two hours. On cooling, the product soon separated from the reaction mixture and was subsequently collected by means of suction filtration and recrystallized from ethanol to afford 1-(4-carboxyphenoxymethyl)-3,4-dihydroisoquinoline hydrochloride, M.P. 225–228° C.

*Analysis.*—Calcd. for $C_{17}H_{16}ClNO_3$: C, 64.24; H, 5.08; N, 4.41. Found: C, 64.51; H, 4.86; N, 4.32.

The above acid was then converted to the corresponding sodium salt via treatment with two equivalents of sodium hydroxide that were added to a solution of the aforementioned hydrochloride in 50% aqueous ethanol. Upon partial evaporation of the resulting basic aqueous solution to a fraction of its original volume while under reduced pressure, there was obtained the desired sodium salt which soon separated from the mixture and was subsequently collected by means of suction filtration. After one recrystallization from ethanol, the product gave the pure sodium salt of 1-(4-carboxyphenoxymethyl)-3,4-dihydroisoquinoline, M.P. >320° C.

EXAMPLE XXI

A solution consisting of 25 g. of 1-(4-carboxyphenoxymethyl)-3,4-dihydroisoquinoline hydrochloride dissolved in 200 ml. of 5% methanolic hydrogen chloride was heated to reflux for seven hours. The methanol solvent was then removed by means of evaporation while under reduced pressure and the residue made alkaline by the addition of a saturated sodium bicarbonate solution thereto. Upon extraction of the resulting basic aqueous solution with diethyl ether, there was obtained an organic layer which was subsequently dried over anhydrous sodium sulfate and filtered. After removal of the drying agent by means of filtration, ethereal hydrogen chloride was added to the filtrate to precipitate the insoluble acid addition salt. In this manner, there was obtained 1-(4-methoxycarbonylphenoxymethyl) - 3,4-dihydroisoquinoline hydrochloride, M.P. 205–207° C. after recrystallization from methanol-diethyl ether (the yield of colorless crystals amounted to 19.0 g.).

*Analysis.*—Calcd. for $C_{18}H_{18}ClNO_3$: C, 65.15; H, 5.47; N, 4.22. Found: C, 65.03; H, 5.79; N, 4.51.

EXAMPLE XXII

To a solution of 12 g. of 2,6-dichlorophenoxyacetonitrile in 10 ml. of dry xylene, there were added, with cooling, 15.5 g. of stannic chloride followed by 8.4 g. of β-phenylethyl chloride. The resulting mixture was then stirred and heated to reflux, and kept at the latter point for three hours, after which time it was allowed to cool and then slowly poured into 100 ml. of ice-cold water. The resulting aqueous mixture was then basified with excess 50% aqueous sodium hydroxide, and the product extracted therefrom by means of three-successive 200 ml. portions of diethyl ether. After drying the combined ether extracts over anhydrous magnesium sulfate and filtering, dry ethereal hydrogen chloride was passed into the resulting solution in a dropwise manner until precipitation of the crude hydrochloride salt was complete. The ethereal suspension was then stirred for one-half hour at 0° C. before filtering.

The crude material so obtained was then dissolved in 50 ml. of methanol and treated with activated charcoal. This solution was then filtered and concentrated in vacuo to 20 ml., followed by the addition of an equal volume of diethyl ether to the resulting concentrate. The crystalline precipitate, which formed on standing, was then collected by means of suction filtration and subsequently recrystallized from 5 N hydrochloric acid to give 1-(2,6-dichlorophenoxymethyl)-3,4-dihydroisoquinoline hydrochloride, M.P. 168° C.

EXAMPLE XXIII

A solution consisting of 3.0 g. of 1-(4-(chlorophenoxymethyl)-3,4-dihydroisoquinoline hydrochloride (prepared as described in Example I) dissolved in 20 ml. of methanol was treated with 1.0 g. of sodium bicarbonate to liberate the free base, followed by 1.6 g. of sodium borohydride added in small portions, with stirring, over a tenminute period. The reaction mixture was then allowed to stand at room temperature for one hour and the methanol subsequently removed therefrom by means of evaporation under reduced pressure. To the resulting residue, there were added 50 ml. of water followed by extraction with diethyl ether in several small portions. The combined ethereal extracts were then dried over anhydrous magnesium sulfate, filtered and the resulting filtrate treated with ethereal hydrogen chloride to afford a precipitate of the desired acid addition salt. After recrystallization from ethanol-diethyl ether, there was obtained a 1.62 g. (55%) yield of 1 - (4 - chlorophenoxymethyl)-1,2,3,4-tetrahydroisoquinoline hydrochloride in the form of colorless crystals melting at 198–200° C.

tetrahydroisoquinolines starting from the appropriate 3,4-dihydroisoquinoline compound in each case. These new 1,2,3,4-tetrahydroisoquinolines are listed below in the table as follows:

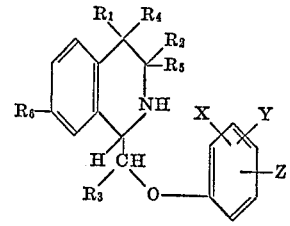

| $R_1$ | $R_2$ | $R_3$ | $R_4$ | $R_5$ | $R_6$ | X | Y | Z |
|---|---|---|---|---|---|---|---|---|
| H | H | H | H | H | H | 4-OCH$_3$ | H | H |
| H | H | H | H | H | H | 2-CH$_3$ | 4-OH | H |
| H | H | CH$_3$ | H | H | H | 2-F | H | H |
| H | CH$_3$ | H | H | CH$_3$ | H | 4-Cl | H | H |
| H | H | H | H | H | H | 4-NO$_2$ | H | H |
| CH$_3$ | H | H | H | H | H | 2-Cl | H | H |
| H | H | CH$_3$ | H | H | H | 3-Cl | H | H |
| CH$_3$ | H | H | H | H | H | H | H | H |
| H | CH$_3$ | H | H | H | H | H | H | H |
| H | H | CH$_3$ | H | H | H | H | H | H |
| H | H | H | H | H | H | 3-CH$_3$ | H | H |
| H | H | H | H | H | H | 4-CH$_3$ | H | H |
| H | H | H | H | H | H | 2-CH$_3$ | 4-CH$_3$ | H |
| H | H | H | H | H | H | 3-CH$_3$ | 4-CH$_3$ | H |
| H | H | H | H | H | H | 4-OCH$_3$ | H | H |
| H | H | H | H | H | CH$_3$ | 4-OCH$_3$ | H | H |
| H | H | H | H | H | H | 4-OH | H | H |
| H | H | H | H | H | CH$_3$ | 4-OH | H | H |
| H | H | H | H | H | H | 4-COOH | H | H |
| H | H | H | H | H | H | 4-CN | H | H |
| H | H | H | H | H | H | 2-F | H | H |
| H | H | H | H | H | H | 3-F | H | H |
| H | H | H | H | H | H | 4-F | H | H |
| H | H | CH$_3$ | H | H | H | 4-Cl | H | H |
| H | H | H | H | H | CH$_3$ | 4-Cl | H | H |
| H | H | H | H | H | H | 2-Cl | 6-Cl | H |
| H | H | H | H | H | H | 2-CH$_3$ | 4-Cl | H |
| H | H | CH$_3$ | H | H | H | 2-CH$_3$ | 4-Cl | H |
| H | H | H | H | H | H | 2-CH$_3$ | 4-Cl | 6-CH$_3$ |

*Analysis.*—Calcd. for C$_{16}$H$_{17}$Cl$_2$NO: C, 61.94; H, 5.53; N, 4.52; Cl, 11.43. Found: C, 62.05; H, 5.55; N, 4.58; Cl, 11.65.

EXAMPLE XXIV

The procedure of the previous example was repeated to prepare the following 1-phenoxymethyl-1,2,3,4-tetrahydroisoquinolines, starting from the appropriate corresponding 3,4-dihydroisoquinoline in each case:

1-phenoxymethyl - 1,2,3,4 - tetrahydroisoquinoline hydrochloride, M.P. 205–207° C.
1 - (3 - chlorophenoxymethyl)-1,2,3,4-tetrahydroisoquinoline hydrochloride, M.P. 184–185° C.
1-(4 - bromophenoxymethyl)-1,2,3,4-tetrahydroisoquinoline hydrochloride, M.P. 208–209° C.

EXAMPLE XXV

The procedure described in the previous example is used to prepare various other 1-phenoxymethyl-1,2,3,4-

EXAMPLE XXVI

The procedure described in Example I is repeated to prepare the following 1-phenoxyalkyl-3,4-dihydroisoquinoline compounds from the appropriate starting materials:

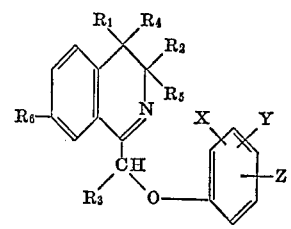

| $R_1$ | $R_2$ | $R_3$ | $R_4$ | $R_5$ | $R_6$ | X | Y | Z |
|---|---|---|---|---|---|---|---|---|
| H | H | H | H | H | H | 3-NO$_2$ | H | H |
| H | H | H | H | H | H | 3-NO$_2$ | 4-CH$_3$ | H |
| CH$_3$ | H | H | H | H | H | 2-CN | H | H |
| H | H | H | H | H | n-C$_4$H$_9$ | H | H | H |
| H | C$_2$H$_5$ | H | H | H | C$_2$H$_5$ | 4-CH$_3$ | H | H |
| CH$_3$ | CH$_3$ | H | H | H | CH$_3$ | 2-NO$_2$ | H | H |
| H | H | H | H | H | CH$_3$ | 3-CN | H | H |
| C$_2$H$_5$ | H | H | H | H | H | 2-Cl | 4-Cl | H |
| H | H | CH$_3$ | H | H | CH$_3$ | 4-Br | H | H |
| H | H | H | H | H | H | 2-CN | H | H |
| H | H | H | n-C$_3$H$_9$ | H | H | H | H | H |
| H | H | H | H | H | H | 2-NO$_2$ | H | H |
| H | H | H | H | H | H | 4-CN | 2-CN | H |
| H | H | H | H | n-C$_4$H$_9$ | H | H | H | H |
| H | H | H | H | H | H | 3-CN | H | H |
| H | H | H | H | H | CH$_3$ | 2-CN | 3-CN | H |
| H | C$_2$H$_5$ | H | H | C$_2$H$_5$ | H | 2-Cl | H | H |
| H | n-C$_4$H$_9$ | H | H | n-C$_4$H$_9$ | H | 2-Cl | H | H |
| H | CH$_3$ | H | H | CH$_3$ | H | 4-OC$_6$H$_{11}$(l) | H | H |
| H | n-C$_3$H$_7$ | H | H | n-C$_3$H$_7$ | H | 4-Cl | H | H |

| R₁ | R₂ | R₃ | R₄ | R₅ | R₆ | X | Y | Z |
|---|---|---|---|---|---|---|---|---|
| H | H | H | H | H | H | 2-Cl | 4-Cl | H |
| H | H | n-C₄H₉ | H | H | H | 4-Cl | 6-Cl | H |
| H | H | H | H | H | H | 4-Cl | 2-(n-C₄H₉) | 6-(n-C₄H₉) |
| H | H | H | H | H | H | 2-Cl | 4-CH₃ | 6-CH₃ |
| H | H | H | H | H | H | 6-Cl | 2-C₂H₅ | 6-CH₃ |
| H | H | H | H | H | CH₃ | 4-F | H | H |
| H | CH₃ | H | H | CH₃ | H | 3-Br | H | H |
| H | H | H | H | H | H | 2-Br | 4-CH₃ | H |
| H | H | H | H | H | CH₃ | 2-CH₃ | 4-Cl | H |
| H | H | H | H | H | H | 2-CH₃ | 4-NO₂ | H |
| H | CH₃ | H | H | CH₃ | H | 2-CH₃ | 4-CH₃ | H |
| H | H | C₂H₅ | H | H | H | 3-CH₃ | 4-CH₃ | H |
| H | H | H | H | H | iso-C₃H₇ | 2-Cl | 4-Cl | H |
| CH₃ | CH₃ | H | H | H | H | 2-Br | 4-Br | H |
| H | H | H | H | H | H | 2-Br | 4-NO₂ | 6-Br |
| H | H | H | H | H | CH₃ | 2-CH₃ | 6-CH₃ | H |
| H | H | H | H | H | H | 2-CN | 4-CN | 6-CN |
| H | H | CH₃ | H | H | H | 2-OCH₃ | 4-OCH₃ | H |
| H | CH₃ | H | H | CH₃ | H | 2-Cl | 4-CH₃ | H |
| H | n-C₄H₉ | H | H | n-C₄H₉ | H | 4-Cl | H | H |
| H | H | H | H | H | iso-C₄H₉ | 2-Cl | 6-Cl | H |
| H | H | H | H | H | H | 2-NO₂ | 4-NO₂ | H |
| CH₃ | H | H | H | H | H | 4-(iso-C₃H₇) | H | H |
| H | H | H | H | H | H | 4-CN | 2-CH₃ | H |
| H | CH₃ | H | H | CH₃ | H | 4-OCH₃ | 3-CN | 5-NO₂ |
| H | H | H | H | H | H | 2-CH₃ | 4-CH₃ | 5-CN |
| H | H | H | H | C₂H₅ | H | 4-CN | 3-Cl | 5-Cl |
| H | H | H | H | H | H | 2-CH₃ | 3-Cl | H |
| H | CH₃ | H | H | CH₃ | H | 4-CN | 4-CH₃ | 6-CH₃ |
| H | H | H | H | H | H | 2-Cl | 5-OCH₃ | H |
| C₂H₅ | H | H | H | H | H | 2-NO₂ | 4-CH₃ | H |
| H | CH₃ | H | H | CH₃ | H | 2-NO₂ | 4-NO₂ | 6-CH₃ |
| H | H | H | H | H | H | 2-NO₂ | 4-NO₂ | 6-NO₂ |
| H | H | CH₃ | H | H | CH₃ | 2-OCH₃ | 4-CN | 6-OCH₃ |
| H | H | H | H | H | H | 2-Br | 4-Br | 6-Br |
| H | CH₃ | H | H | CH₃ | H | 3-OCH₃ | 4-OCH₃ | 5-OCH₃ |

EXAMPLE XXVII

The procedure described in Example IX is repeated to prepare the following 1-hydrophenoxyalkyl-3,4-dihydroisoquinoline compounds from the appropriate 1-alkoxyphenoxyalkyl-3,4-dihydroisoquinoline starting materials reported earlier in the specification:

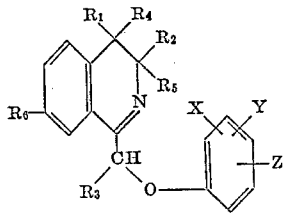

| R₁ | R₂ | R₃ | R₄ | R₅ | R₆ | X | Y | Z |
|---|---|---|---|---|---|---|---|---|
| H | CH₃ | H | H | CH₃ | H | 4-OH | H | H |
| H | H | CH₃ | H | H | H | 2-OH | 4-OH | H |
| H | H | H | H | H | H | 4-OH | 3-CN | 5-NO₂ |
| C₂H₅ | H | H | H | H | H | 2-Cl | 5-OH | H |
| H | H | CH₃ | H | H | CH₃ | 2-OH | 4-CN | 6-OH |
| H | CH₃ | H | H | CH₃ | H | 3-OH | 4-OH | 5-OH |

EXAMPLE XXVIII

The procedure described in Example XX is repeated to prepare the following 1-carboxyphenoxyalkyl-3,4-dihydroisoquinoline compounds from the corresponding 1-cyanophenoxyalkyl-3,4-dihydroisoquinoline starting materials reported previously in Examples XXVI–XXVII:

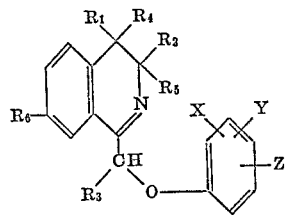

EXAMPLE XXIX

The procedure described in Example XXI is repeated to prepare the methyl esters of the corresponding 1-carboxyphenoxyalkyl-3,4-dihydroisoquinolines reported previously in the preceding example. In like maner, the corresponding ethyl, n-propyl, isopropyl, n-butyl, sec-butyl, n-amyl and isoamyl esters of all these 1-carboxyphenoxyalkyl - 3,4 - dihydroisoquinoline compounds are simply prepared by merely substituting the appropriate lower alkanol for methanol in the reaction scheme of Example XXI. In each and every instance, the corresponding lower 1-alkoxycarbonylphenoxyalkyl-3,4-dihydroisoquinoline compounds (i.e., the ester) is always the product obtained.

EXAMPLE XXX

The procedure described in Example XXIII is followed to prepare still other 1-phenoxyalkyl-1,2,3,4-tetrahydroisoquinoline compounds starting from the appropriate 3,4-dihydroisoquinolines corresponding to those previously reported in Examples I–IV, IX–XXII and XXVI–XXIX, respectively. In each and every case, the corresponding 1,2,3,4-tetrahydroisoquinoline is always the product obtained.

EXAMPLE XXXI

The general procedure of Example V is repeated again to prepare other acid addition salts of the polyhydroisoquinoline compounds reported previously in Examples

| R₁ | R₂ | R₃ | R₄ | R₅ | R₆ | X | Y | Z |
|---|---|---|---|---|---|---|---|---|
| CH₃ | H | H | H | H | H | 2-COOH | H | H |
| H | H | H | H | H | CH₃ | 3-COOH | H | H |
| H | H | H | H | H | H | 2-COOH | H | H |
| H | H | H | H | H | H | 3-COOH | H | H |
| H | CH₃ | H | H | CH₃ | H | 4-COOH | 2-CH₃ | 5-NO₂ |
| H | CH₃ | H | H | H | H | 4-OH | 3-COOH | H |
| H | H | H | H | H | H | 4-COOH | 2-COOH | 5-COOH |
| H | H | H | H | H | C₂H₅ | 2-CH₃ | 4-CH₃ | 5-Cl |
| H | H | H | H | H | H | 4-COOH | 3-Cl | 5-Cl |
| H | H | H | H | H | H | 2-COOH | 4-COOH | 6-COOH |
| H | H | H | H | H | H | 4-COOH | 3-Cl | H |
| H | CH₃ | H | H | CH₃ | H | 2-OH | 4-COOH | 6-OH |
| H | H | CH₃ | H | H | H | 3-COOH | H | H |
| H | H | H | H | H | H | 2-COOH | 3-COOH | H |

IX–XXX. This, in turn, involves using the latter compounds as starting material in every instance and hydrochloric, hydrobromic, hydriodic, nitric, sulfuric, phosphoric, acetic, lactic, citric, tartaric, oxalic, gluconic, saccharic, benzoic, succinic, maleic, methanesulfonic, ethanesulfonic, benzenesulfonic, p-toluenesulfonic, amsonic and pamoic acids as the respective reagents in every case.

We claim:

1. A polyhydroisoquinoline compound selected from the group consisting of compounds of the formulae:

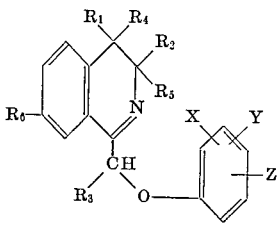

and

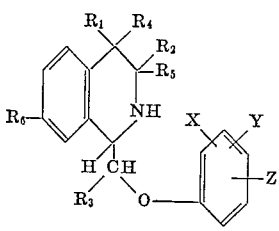

and the pharmaceutically acceptable salts thereof wherein each of $R_1$, $R_2$, $R_3$, $R_4$, $R_5$ and $R_6$ are hydrogen or methyl, X is hydrogen, alkyl having up to 5 carbon atoms, alkoxy having up to 5 carbon atoms, hydroxy, carboxy, carbalkoxy having up to 5 carbon atoms in the alkoxy moiety, cyanonitro, fluorine, chlorine and bromine and Y and Z are each hydrogen or methyl.

2. A compound as claimed in claim 1 of the formula:

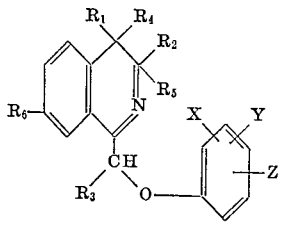

wherein each of $R_1$, $R_2$, $R_3$, $R_4$, $R_5$ and $R_6$ are hydrogen or methyl, X is hydrogen, alkyl having up to 5 carbon atoms, alkoxy having up to 5 carbon atoms, hydroxy, carboxy, carbalkoxy having up to 5 carbon atoms in the alkoxy moiety, cyano, nitro, fluorine, chlorine and bromine and Y and Z are each hydrogen or methyl.

3. A compound as claimed in claim 2 wherein $R_1$, $R_2$, $R_3$, $R_4$, $R_5$ and $R_6$ are each hydrogen, Y and Z are hydrogen and X is chlorine.

4. A compound as claimed in claim 2 wherein $R_1$, $R_2$, $R_3$, $R_4$, $R_5$ and $R_6$ are each hydrogen, Y and Z are hydrogen and X is hydroxy.

5. A compound as claimed in claim 2 wherein $R_1$, $R_2$, $R_3$, $R_4$, $R_5$ and $R_6$ are each hydrogen, Y and Z are alkyl each having up to four carbon atoms and X is chlorine.

6. A compound as claimed in claim 1 of the formula:

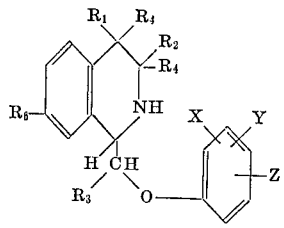

wherein each of $R_1$, $R_2$, $R_3$, $R_4$, $R_5$ and $R_6$ are hydrogen or methyl, X is hydrogen, alkyl having up to 5 carbon atoms, alkoxy having up to 5 carbon atoms, hydroxy, carboxy, carbalkoxy having up to 5 carbon atoms in the alkoxy moiety, cyano, nitro, fluorine, chlorine and bromine and Y and Z are each hydrogen or methyl.

7. A compound as claimed in claim 6 wherein $R_1$, $R_2$, $R_3$, $R_4$, $R_5$ and $R_6$ are each hydrogen, Y and Z are hydrogen and X is chlorine.

8. A compound of the formula:

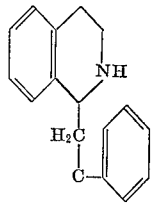

9. A compound of the formula:

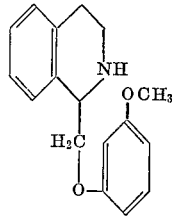

10. A compound of the formula:

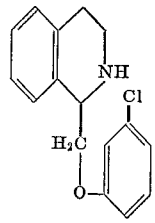

References Cited

Dorme et al.: Chem. Abstr., vol. 63, col. 14809 (1965).

ALEX MAZEL, *Primary Examiner.*

D. G. DAUS, *Assistant Examiner.*

U.S. Cl. X.R.

260—543, 289, 558, 632, 465; 424—258

UNITED STATES PATENT OFFICE
CERTIFICATE OF CORRECTION

Patent No. 3,437,662                                                                    April 8, 1969

David R. Gildersleve et al.

It is certified that error appears in the above identified patent and that said Letters Patent are hereby corrected as shown below:

Column 17, lines 40 to 48, that portion of the formula reading

            should read            

Column 18, lines 23 to 30, that portion of the formula reading

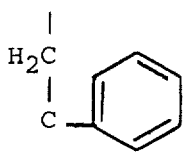            should read            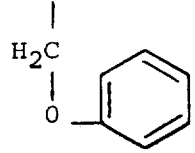

same column 18, lines 33 to 42 and lines 44 to 53, those portions of each formula reading

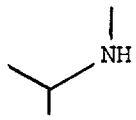            should read            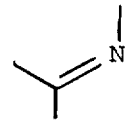

Signed and sealed this 10th day of March 1970.

(SEAL)
Attest:

EDWARD M. FLETCHER, JR.                                      WILLIAM E. SCHUYLER, J
Attesting Officer                                                 Commissioner of Patent